US012269941B2

(12) United States Patent
Chen et al.

(10) Patent No.: US 12,269,941 B2
(45) Date of Patent: Apr. 8, 2025

(54) SURFACTANT STABILIZATION OF HYGROSCOPIC SPECIES

(71) Applicant: ECOLAB USA INC., Saint Paul, MN (US)

(72) Inventors: Emily Chen, Saint Paul, MN (US); Derrick Anderson, Saint Paul, MN (US); David Dotzauer, Saint Paul, MN (US); Erik C. Olson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 93 days.

(21) Appl. No.: 16/946,555

(22) Filed: Jun. 26, 2020

(65) Prior Publication Data

US 2020/0407544 A1 Dec. 31, 2020

Related U.S. Application Data

(60) Provisional application No. 62/868,058, filed on Jun. 28, 2019.

(51) Int. Cl.
| | |
|---|---|
| *C08L 33/08* | (2006.01) |
| *C08K 5/17* | (2006.01) |
| *C08K 5/42* | (2006.01) |

(52) U.S. Cl.
CPC .............. *C08L 33/08* (2013.01); *C08K 5/175* (2013.01); *C08K 5/42* (2013.01)

(58) Field of Classification Search
CPC ............ C08L 33/08; C08K 5/175; C08K 5/42
See application file for complete search history.

(56) References Cited

U.S. PATENT DOCUMENTS

| | | | |
|---|---|---|---|
| 3,351,558 | A | 11/1967 | Zimmerer |
| 3,839,215 | A | 10/1974 | Mulders |

(Continued)

FOREIGN PATENT DOCUMENTS

| | | |
|---|---|---|
| EP | 0481792 A1 | 4/1992 |
| EP | 0935456 A1 | 8/1999 |

(Continued)

OTHER PUBLICATIONS

Muhammad et al., "Recent Advances and Patents in Solid Dispersion Technology", Recent Patents on Drug Delivery & Formulation, vol. 5, No. 3, 1 page, Jan. 1, 2011.

(Continued)

*Primary Examiner* — John E Uselding
(74) *Attorney, Agent, or Firm* — McKee, Voorhees & Sease, PLC (57) ABSTRACT

Stable solid compositions employing a water conditioning agent, including hygroscopic species or non-hygroscopic species. In particular, solid compositions combining an ionic surfactant or an amphoteric surfactant with a water conditioning agent, preferably a polyacrylate water conditioning agent, are disclosed. The ionic surfactant or amphoteric surfactant beneficially stabilize the polymer and/or chelant water conditioning agent, preferably a polyacrylate water conditioning agent, to permit formulation into a solid composition and provide stability under harsh conditions, including humid environments. Applications of using the stable solid compositions are also disclosed.

5 Claims, 3 Drawing Sheets

Formulation A    Formulation B

(56) References Cited

U.S. PATENT DOCUMENTS

| | | | |
|---|---|---|---|
| 4,320,147 A | 3/1982 | Schaeufele | |
| 5,152,910 A * | 10/1992 | Savio | C11D 3/3761 |
| | | | 510/475 |
| 5,389,685 A | 2/1995 | Smith et al. | |
| 5,520,842 A | 5/1996 | Ponce et al. | |
| 5,545,749 A | 8/1996 | Smith et al. | |
| 5,547,990 A | 8/1996 | Hall et al. | |
| 5,833,741 A | 11/1998 | Walker | |
| 5,972,361 A | 10/1999 | Fowler et al. | |
| 5,980,931 A | 11/1999 | Fowler et al. | |
| 6,063,397 A | 5/2000 | Fowler et al. | |
| 6,338,855 B1 | 1/2002 | Albacarys et al. | |
| 6,464,764 B1 | 10/2002 | Lichtenberg et al. | |
| 6,583,181 B1 | 6/2003 | Chiang et al. | |
| 6,939,840 B2 | 9/2005 | Lichtenberg et al. | |
| 8,221,733 B2 | 7/2012 | Lichtenberg et al. | |
| 8,785,361 B2 | 7/2014 | Sivik et al. | |
| 10,206,392 B2 | 2/2019 | Kloeppel et al. | |
| 10,285,400 B2 | 5/2019 | Lei et al. | |
| 2003/0029812 A1 | 2/2003 | Burns et al. | |
| 2003/0114342 A1 | 6/2003 | Hall | |
| 2003/0187073 A1 | 10/2003 | Lichtenberg et al. | |
| 2004/0220275 A1 | 11/2004 | Utzeler et al. | |
| 2005/0124723 A1 | 6/2005 | Fritschi et al. | |
| 2009/0105111 A1* | 4/2009 | Stolte | C11D 3/3707 |
| | | | 510/392 |
| 2009/0176687 A1* | 7/2009 | Tjelta | C11D 17/0065 |
| | | | 524/556 |
| 2012/0231990 A1* | 9/2012 | Besse | C11D 17/0047 |
| | | | 510/471 |
| 2014/0171512 A1 | 6/2014 | Kloeppel et al. | |
| 2017/0284605 A1 | 10/2017 | Janak et al. | |
| 2018/0066213 A1* | 3/2018 | Lo | C11D 17/0073 |
| 2020/0229435 A1 | 7/2020 | Malet et al. | |
| 2020/0305437 A1 | 10/2020 | McGeechan et al. | |

FOREIGN PATENT DOCUMENTS

| | | |
|---|---|---|
| GB | 2422107 B | 7/2006 |
| WO | 0035283 A1 | 6/2000 |
| WO | 0059696 A2 | 10/2000 |
| WO | 2005061689 A1 | 7/2005 |
| WO | 2008049616 A1 | 5/2008 |
| WO | 2008135869 A1 | 11/2008 |
| WO | 2009087540 A1 | 7/2009 |
| WO | 2012120442 A2 | 9/2012 |
| WO | 2018183690 A1 | 10/2018 |
| WO | 2019067560 A1 | 4/2019 |

OTHER PUBLICATIONS

Swift, G., "Polymeric dispersants in powdered laundry detergents", Powdered Detergents, pp. 109-135, Oct. 6, 2017.

International Searching Authority in connection with PCT/US20/39727 file Jun. 26, 2020, "The International Search Report and the Written Opinion of the International Searching Authority, or the Declaration", 17 pages, mailed Dec. 4, 2020.

* cited by examiner

5% Amine Oxide

FIG. 4A 7.5% Amine Oxide

FIG. 4B

10% Amine Oxide

SURFACTANT STABILIZATION OF HYGROSCOPIC SPECIES

CROSS-REFERENCE TO RELATED APPLICATION

This application claims priority under 35 U.S.C. § 119 to Provisional Application U.S. Ser. No. 62/868,058, filed on Jun. 28, 2019, which is herein incorporated by reference in its entirety including without limitation, the specification, claims, and abstract, as well as any figures, tables, or examples thereof.

FIELD OF THE INVENTION

The invention relates to stabilized solid compositions employing a water conditioning agent, including hygroscopic species of water conditioning agents, and an ionic surfactant or an amphoteric surfactant. In particular, solid compositions combining an ionic surfactant or an amphoteric surfactant with a polymer hygroscopic species and/or chelant hygroscopic species, preferably a polyacrylate water conditioning agent, are disclosed. The ionic surfactant or amphoteric surfactant beneficially stabilizes the polymer and/or chelant water conditioning agent to permit formulation into a solid composition and provide stability under harsh conditions, including humid environments. Applications of using the stable solid compositions containing water conditioning agents are also provided.

BACKGROUND OF THE INVENTION

Water conditioning polymers, including hygroscopic water conditioning materials can be difficult to incorporate into solid compositions. For example, hygroscopic materials are known to take up and retain moisture when they are exposed to moisture, such as humidity. Generally, the absorption of water or atmospheric humidity during storage causes the material to form hydrates. To the detriment of maintaining a stable solid composition, hygroscopic materials will absorb moisture in an amount that causes a composition to become a liquid at an extreme. Less hygroscopic materials will absorb moisture in amounts that cause a solid to soften and thereby loose its structural integrity (also measured by a solid's dimensional stability). These difficulties in formulating hygroscopic materials into solid compositions present significant challenges in formulating a number of types of solids needed for various cleaning, disinfecting, water treatment, and other applications.

Certain water conditioning polymers, such as polyacrylates, are very hygroscopic and therefore are traditionally difficult to incorporate into a solid composition that is stable in humid environments. In addition, non-hygroscopic water conditioning polymers are also difficult to incorporate into solid compositions at high levels (as opposed to all-in-one or other detergents that incorporate water conditioning polymers at low levels where it is not the primary component of the composition). This has prevented use of such polyacrylates in solid compositions, limiting options for consumers who prefer solid compositions.

Accordingly, there is an ongoing need and consumer demand for solid compositions that can incorporate water conditioning polymers, including hygroscopic water conditioning agents, such as polyacrylate water conditioning agents. For example, liquid products containing these materials can contain as much as 90% to about 95% water. These products require a great amount of packaging material, the transport of large weight (making shipping expensive), and large shelf space in the retail stores. Although liquid concentrated compositions are available, there remains a significant water content in the liquid compositions. Moreover, any liquid formulation will have shorter shelf-stability than an equivalent stable solid composition. Accordingly, there is a need and demand for improved and stable solid compositions to take advantage of their benefits—compactness of the compositions for transportation, reduced shipment costs, less packaging, more readily disposable containers that can be used, less chance for messy leakage, and less shelf space required in the retail stores. Solid formulations are also more stable to storage, and extremes of temperature. Despite these many advantages of a solid composition, it is still a challenge to develop a formulation of a solid containing hygroscopic materials.

Accordingly, it is an object herein to provide a stabilized solid composition containing a water conditioning agent and ionic surfactant and/or amphoteric surfactant.

It is another object herein to provide a stabilized solid composition containing a hygroscopic water conditioning agent and ionic surfactant and/or amphoteric surfactant.

It is yet another object herein to provide such solid compositions that can be exposed to temperature and humidity while maintaining dimensional stability.

It is yet another object herein to provide solid compositions containing a polyacrylate water conditioning agent that does not swell above 3%, 4%, or 5% and/or has a dimensional stability of at least 5%, or preferably 3% during typical storage and transport temperatures.

Other objects, advantages and features will become apparent from the following specification taken in conjunction with the accompanying drawings.

BRIEF SUMMARY OF THE INVENTION

An advantage of the solid compositions employing an anionic surfactant or amine oxide surfactant to stabilize a hygroscopic species, such as a water conditioning agent, is a stabilized solid composition. The compositions overcome limitations of storage, transport and stability of such hygroscopic species that conventionally take on water content and result in unstable solids.

In an embodiment, a stabilized solid composition comprises: at least about ≥40% of a water conditioning polymer and/or chelant; and an effective amount of a surfactant comprising an ionic surfactant and/or amphoteric surfactant, wherein the solid composition has a dimensional stability as measured by a growth exponent of less than about 5%.

In a further embodiment, a stabilized solid composition comprises: a hygroscopic material comprising a water conditioning polymer; and an effective amount of a stabilizing surfactant comprising an ionic surfactant and/or amphoteric surfactant, wherein the solid composition has a ratio of the hygroscopic material to the stabilizing surfactant is from about 2:1 to about 10:1; and wherein the solid composition has a dimensional stability as measured by a growth exponent of less than about 5%.

In a still further embodiment, a method for stabilizing a water conditioning agent into a solid composition comprises: combining a water conditioning agent and an effective amount of a stabilizing surfactant comprising an ionic surfactant and/or amphoteric surfactant to form a solid wherein the solid composition either (A) has a ratio of the water conditioning agent to the stabilizing surfactant is from about 2:1 to about 10:1, or (B) comprises at least about 40 wt-% of the water conditioning agent; wherein the solid is pressed, cast or extruded; and wherein the solid composition has a dimensional stability as measured by a growth exponent of less than about 5%.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

DETAILED DESCRIPTION OF THE PREFERRED EMBODIMENT

The embodiments are not limited to particular solid compositions containing water conditioning agents at a high concentration in combination with ionic and/or amphoteric surfactants, methods of making, and/or methods of using, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning or fabric softening expressed as a percentage minus inert ingredients such as water or salts. As one skilled in the art will recognize, many laundering components are sold as emulsions and the percentage of active ingredients is included by the manufacture. As a matter of example only, if 100% of a final composition is comprised of emulsion X and if emulsion X contains 60% of the active component X, we would say that the final composition contained 60% active component X.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The terms "dimensional stability" and "dimensionally stable" as used herein, refer to a solid product having a growth exponent of less than about 5%, or preferably less than about 3%. If the solid product swells after solidification, various problems may occur, including but not limited to decreased density, integrity, and appearance; and inability to dispense or package the solid product. Generally, a solid product is considered to have dimensional stability if the solid product has a growth exponent of less than about 5%, or preferably less than about 3%. Growth exponent refers to the percent growth or swelling of a product over a period of time, such as 7 days or 14 days, after solidification under normal transport/storage conditions. Because normal transport/storage conditions for products often results in the composition being subjected to an elevated temperature, the growth exponent of a solid product may be determined by measuring one or more dimensions of the product prior to and after heating at between about 100° F. and 122° F. The measured dimension or dimensions depends on the shape of the solid product and the manner in which it swells. For tablets, the change in both diameter and height is generally measured and each measurement must have a growth exponent that is less than the defined measurement to meet the threshold for the growth exponent and dimensional stability. For capsules, just the diameter is normally measured.

The term "hygroscopic" as used herein refers to the ability of a material to take up and retain moisture. As referred to herein "non-hygroscopic" or "not hydroscopic" refers to a material or composition containing a material that when exposed to moisture, such as humidity, does not absorb moisture in an amount that would cause the material or composition to become liquid. Hygroscopic materials cause the solid to absorb water, which may result in a dimensional change.

The term "laundry", "linen," "fabric," and/or "textile" as used herein refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillowcases, towels, table linen, tablecloth, bar mops and uniforms.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "sloughing" refers to large pieces or chunks of material falling out of or away from a solid composition during dispensing when water is used to bring a portion of a solid composition into an aqueous solution for dispensing. The pieces or chunks of solid material fall off the solid during or between dispensing in an unintentional and/or uncontrolled manner when the solid composition is softened by the dispensing water.

The term "solid" refers to a composition in a generally shape-stable form under expected storage conditions, for example a flowable powder, particle, agglomerate, flake, granule, pellet, tablet, lozenge, puck, briquette, brick or block, and whether in a unit dose or a portion from which measured unit doses may be withdrawn. A solid may have varying degrees of shape stability, but typically will not flow perceptibly and will substantially retain its shape under moderate stress, pressure or mere gravity, as for example, when a molded solid is removed from a mold, when an extruded solid exits an extruder, and the like. A solid may have varying degrees of surface hardness, and for example may range from that of a fused solid block whose surface is relatively dense and hard, resembling concrete, to a consistency characterized as less hard. In a preferred embodiment, the solid composition is a solid block and not loose powder or flowable powder.

The term "water soluble" refers to a compound that can be dissolved in water at a concentration of more than 1 wt. %.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The compositions and methods described herein may comprise, consist essentially of, or consist of the components and ingredients as well as other ingredients described herein. As used herein, "consisting essentially of" means that the compositions and methods may include additional steps, components or ingredients, but only if the additional steps, components or ingredients do not materially alter the basic and novel characteristics of the claimed compositions and methods. It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Stabilized Solid Compositions

The stabilized solid compositions according to the disclosure comprise, consist of, and/or consist essentially of a water conditioning package (i.e. a water conditioning polymer and/or a chelant) and an ionic surfactant and/or amphoteric surfactant. In certain embodiments, the stabilized solid compositions comprise, consist of, and/or consist essentially of a hygroscopic water conditioning package (i.e. a water conditioning polymer) and an ionic surfactant and/or amphoteric surfactant. The stabilized solid compositions can also include additional functional ingredients depending upon the application of use for the stabilized solid composition. In an exemplary embodiment, a stabilized solid water conditioning composition can further include a chelant, thickener or solidification agents, and other additional functional ingredients.

In embodiments, the stabilized solid compositions have a ratio of the hygroscopic solid to the stabilizing surfactant actives in the range of about 2:1 to about 10:1, 3:1 to about 10:1, 4:1 to about 10:1, about 5:1 to about 10:1, about 6:1 to about 10:1, about 7:1 to about 10:1, about 8:1 to about 10:1, about 9:1 to about 10:1, or any ranges therebetween.

Water Conditioning Agent

The stabilized solid compositions described herein include at least one water conditioning agent in need of stabilization to formulate a stable solid. As referred to herein, the water conditioning agents include both polymers and/or chelants, and hygroscopic or non-hygroscopic materials. In certain embodiments, the stabilized solid compositions described herein include at least one hygroscopic material in need of stabilization to formulate a stable solid.

Polycarboxylic Acid Polymers

Exemplary water conditioning polymers or polymer systems (both hygroscopic or non-hygroscopic), include polycarboxylic acid polymers, copolymers, and/or terpolymers. Salts of each of the polycarboxylic acid polymers, copolymers, and/or terpolymers may further be employed.

In an embodiment, the hygroscopic material is a polycarboxylic acid polymer (or salts thereof), including polyacrylic acid copolymers, polyacrylic acid polymers modified by a fatty acid end group ("modified polyacrylic acid polymers"), polymaleic acid homopolymers, polyacrylic/sulfonic copolymers, maleic/diisobutylene copolymers, polymethacrylate, polyitaconic acid, and maleic anhydride/olefin copolymers. Non-limiting examples of polycarboxylic acid polymer salts include polyacrylic acid salts and derivatives, such as water soluble acrylic polymers. Such polymers include, but are not limited to, polyacrylic acid, polymethacrylic acid, acrylic acid, acrylic acid-methacrylic acid copolymers, polymaleic acid, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, and the like, or combinations thereof or copolymers thereof. Water soluble salts or partial salts of these polymers such as their respective alkali metal (e.g., sodium, potassium, or combinations thereof) or ammonium salts can also be used.

An example of particularly suitable commercially available polyacrylic acid polymer and salts and derivatives thereof includes, but is not limited to, Acusol 445ND, available from Rohm & Haas LLC. An example of particularly suitable commercially available modified polyacrylic acid polymer includes, but is not limited to, Alcosperse 325, available from Alco Chemical. Examples of particularly suitable commercially available polymaleic acid polymers include, but are not limited to: Belclene 200, available from Houghton Chemical Corporation and Aquatreat AR-801, available from Alco Chemical.

Polyacrylic acid polymers, copolymers, and/or terpolymers (or salts thereof) are preferred hygroscopic materials in the solid compositions. Poly acrylic acids have the following structural formula where n is any integer. Examples of suitable polyacrylic acid polymers, copolymers, and/or terpolymers, include but are not limited to, the polymers, copolymers, and/or terpolymers of polyacrylic acids, $(C_3H_4O_2)_n$ or 2-Propenoic acid, acrylic acid, polyacrylic acid, propenoic acid. Examples of particularly suitable polyacrylic acid polymers and modified polyacrylic acid polymers and salts and derivatives thereof, include those having a molecular weight of between about 1,000 and about 100,000 g/mol, or between about 1,000 and about 25,000 g/mol. In alternative embodiments, the solid compositions may include at least two polyacrylic acid polymers having different molecular weights.

In an embodiment, suitable acrylic acid polymers, copolymers, and/or terpolymers have a molecular weight (MW in g/mol) between about 100 and about 10,000, in a preferred embodiment between about 500 and about 7000, between about 1000 and about 5000, or between about 1500 and about 3500. Examples of polyacrylic acid polymers, copolymers, and/or terpolymers (or salts thereof) which may be used include, but are not limited to, Acusol 448 and Acusol 425 from The Dow Chemical Company. In additional embodiments acrylic acid polymers (and salts thereof) with molecular weights greater than about 10,000 are included. Examples include but are not limited to, Acusol 929 (10,000 MW) and Acumer 1510 (60,000 MW) both also available from Dow Chemical, AQUATREAT AR-6 (100,000 MW) from AkzoNobel.

Polymaleic acid $(C_4H_2O_3)x$ or hydrolyzed polymaleic anhydride or cis-2-butenedioic acid homopolymer, has the structural formula:

where n and m are any integer. Examples of polymaleic acid homopolymers, copolymers, and/or terpolymers (and salts thereof) which may be used for the invention are particularly preferred are those with a molecular weight of about 0 and about 5000, more preferably between about 200 and about 2000 (can you confirm these MWs). Commercially available polymaleic acid homopolymers include the Belclene 200 series of maleic acid homopolymers from BWA™ Water Additives, and Aquatreat AR-801 available from AkzoNobel.

Maleic anhydride/olefin copolymers are copolymers of polymaleic anhydrides and olefins. Maleic anhydride $(C_2H_2(CO)_2O$ has the following structure:

A part of the maleic anhydride can be replaced by maleimide, N-alkyl($C_{1-4}$) maleimides, N-phenyl-maleimide, fumaric acid, itaconic acid, citraconic acid, aconitic acid, crotonic acid, cinnamic acid, alkyl ($C_{1-18}$) esters of the foregoing acids, cycloalkyl($C_{3-8}$) esters of the foregoing acids, sulfated castor oil, or the like. At least 95 wt % of the maleic anhydride polymers, copolymers, or terpolymers have a number average molecular weight of in the range between about 700 and about 20,000, or between about 1000 and about 100,000. A variety of linear and branched chain alpha-olefins can be used. Particularly useful alpha-olefins are dienes containing 4 to 18 carbon atoms, such as butadiene, chloroprene, isoprene, and 2-methyl-1,5-hexadiene; 1-alkenes containing 4 to 8 carbon atoms, preferably $C_{4-10}$, such as isobutylene, 1-butene, 1-hexene, 1-octene, and the like. Particularly suitable maleic anhydride/olefin copolymers have a molecular weight between about 1000 and about 50,000, between about 5000 and about 20,000, or between about 7500 and about 12,500. Examples of maleic anhydride/olefin copolymers include, but are not limited to, Acusol 460N from The Dow Chemical Company.

Phosphonocarboxylic acid copolymer or phosphonopolyacrylic acid homopolymer having the following structure are also suitable polycarboxylic acid polymers:

wherein $R_1$ is a phosphino (—PH(=O)(OH)) or phosphono (—P(=O)(OH)$_2$) end group. The molecular weight is from about 1,000 to about 50,000 g/mol, and the ratio of m:n is from about 1:50 to about 2:5. In an embodiment the phosphino or phosphono end group comprises from about 0.1 wt % to about 12 wt % of the polycarboxylic acid copolymer. In certain aspects $R_1$ is $PO_2H_2$ or $PO_3H_2$. In additional aspects, m is an integer of 0 or larger, and n is an integer of 2 or larger. The value of the maleic group (m) of the phosphonocarboxylic acid copolymer or phosphonopolyacrylic acid homopolymer may be zero for the homopolymer. The value of the acrylic group (n) of the phosphonocarboxylic acid copolymer or phosphonopolyacrylic acid homopolymer may be at least 2. In an aspect of the invention for the copolymer, the sum of m+n is between about 5 to 180, wherein the molecular weight range of the polymer is between about 1,000 and 50,000.

As used herein, the term "phosphono end group" refers to a phosphono functional group according to the formula:

wherein each M is independently H or a cation, preferably both Ms are H. Any reference to phosphonocarboxylic acid copolymers or phosphonopolyacrylic acid homopolymers shall be understood to equally incorporate and include any phosphonocarboxylic acid copolymers or phosphonopolyacrylic acid homopolymers set forth by the above formula. In some embodiments, polyacrylic phosphono end group polymers or acrylic-maleic phosphono end group copolymers have the following general formula (as depicted above): $H_2PO_3$—$(CH_2$—$CHCOOH)_n(CHCOOH$—$CHCOOH)_m$. In some aspects n is an integer greater than 0, m is an integer of 0 (for polyacrylic polymers) or greater (for acrylic-maleic copolymers). For polyacrylates, m is zero. In some aspects n and m are integers independently selected to give a molecular weight of the polymer of between about 500 and 200,000 g/mol, preferably of between 500 and 100,000 g/mol, and more preferably between 1,000 and 25,000 g/mol. In some embodiments, suitable polycarboxylates with phosphono end groups are copolymers of acrylic acid and maleic acid having a phosphono end group and homopolymers of acrylic acid having a phosphono end group. An example of a preferred modified polycarboxylate is a copolymer of acrylic acid and maleic acid with a phosphonic/phosphono end group according to the following general formula:

having variable molecular weights, wherein n is from about 10 mol % to 90 mol %, preferably from about 80 mol %, and wherein m is from about 10 mol % to 90 mol %, preferably from about 20 mol %.

Phosphonocarboxylic acid copolymers or phosphonopolyacrylic acid homopolymers are low-phosphorus, non-nitrogenous and environmentally friendly agents that may be synthesized as a combination of various chain-length phosphonocarboxylic acid copolymers or phosphonopolyacrylic acid homopolymers. Phosphonocarboxylic acid copolymers or phosphonopolyacrylic acid homopolymers may have various chain length polymers and therefore varying molecular weights. Examples of suitable commercially-available phosphonocarboxylic acid copolymers include Acusol 425N, available from Rohm & Haas. Acusol 425N is a low molecular weight (1900 MW) acrylic/maleic (ratio 80/20) copolymer having a phosphono end group (approximately 1.6-1.7 wt-% phosphorus) and has an activity of 50%. In some embodiments, a low molecular weight phosphonocarboxylic acid copolymer is preferred, such as polymers having molecular weight below about 2,000 grams/mole.

The polymers, including the phosphorus end group may be present fully or partly in the neutralized form. In some aspects the phosphonocarboxylic acid copolymers or phosphonopolyacrylic acid homopolymers are neutralized.

Additional description of exemplary polycarboxylates and polyacrylates is provided in U.S. Pat. Nos. 7,537,705 and 3,887,806. For a further discussion of water conditioning polymers, see Kirk-Othmer, Encyclopedia of Chemical Technology, Third Edition, volume 5, pages 339-366 and volume 23, pages 319-320, the disclosure of which is incorporated by reference herein.

Chelant Water Conditioning Agents

Exemplary water conditioning chelants can include phosphonates and/or non-phosphonate chelants, such as aminocarboxylic acid chelants. Exemplary aminocarboxylic acid materials include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), hydroxyethylethylenediaminetriacetic acid and methylglycinediacetic acid (MGDA), glutamic acid-diacetic acid (GLDA), iminodisuccinic acid (IDA), hydroxyiminodisuccinic acid, ethylenediaminedisuccinic acid (EDDS), aspartic acid-diacetic acid, and salts thereof.

Additional Water Conditioning Polymers

Additional exemplary water conditioning polymers may include water-soluble or water-insoluble substances, the main task of which consists in the binding of calcium and magnesium ions. These may be low molecular weight carboxylic acids and salts thereof, such as alkali metal citrates, especially anhydrous trisodium citrate or trisodium citrate dihydrate, alkali metal succinates, alkali metal malonates, fatty acid sulfonates, oxidisuccinate, alkyl or alkenyl disuccinates, gluconic acids, oxadiacetates, carboxymethyloxysuccinates, tartrate monosuccinate, tartrate disuccinate, tartrate monoacetate, tartrate diacetate and a-hydroxypropionic acid.

In an embodiment, the water conditioning polymer is included in the solid composition in an amount of from about 40 wt-% to about 80 wt-%, from about 40 wt-% to about 70 wt-%, or from about 40 wt-% to about 60 wt-% of the solid composition.

In a further embodiment the water conditioning polymer is a hygroscopic material, preferably the polycarboxylic acid polymer, copolymer and/or terpolymer (or salts thereof), and is included in the solid composition in an amount of from about 20 wt-% to about 80 wt-%, from about 20 wt-% to about 60 wt-%, from about 25 wt-% to about 60 wt-%, preferably from about 25 wt-% to about 55 wt-% of the solid composition.

Stabilizing Surfactant

The stabilized solid compositions described herein include at least one stabilizing surfactant. The Stabilizing surfactants include ionic surfactants and/or amphoteric surfactants to formulate a stable solid with the hygroscopic materials. The stabilizing surfactant active concentration in the solid compositions can range from about 1 wt-% to about 40 wt-%, from about 5 wt-% to about 33 wt-%, from about 5 wt-% to about 25 wt-%, from about 7.5 wt-% to about 20 wt-%, from about 10 wt-% to about 20 wt-%, or greater than about 7.5 wt-%.

Anionic Surfactants

Anionic surfactants have a negative charge on the hydrophobe; or the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

Anionic sulfate surfactants suitable for use as a stabilizing surfactant for the hygroscopic material include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly (ethyleneoxy) ether sulfates and aromatic poly(ethyleneoxy) sulfates such as the sulfates or condensation products of ethylene oxide and nonyl phenol (usually having 1 to 6 oxyethylene groups per molecule). Suitable anionics also include alkyl sulfonates, the linear and branched primary and secondary alkyl sulfonates, and the aromatic sulfonates with or without substituents.

Additional suitable anionics include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphoteric portion). Suitable secondary soap surfactants typically contain 11-13 total carbon atoms, although more carbons atoms (e.g. up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is and $R^1$ is a $C_6$-$C_{12}$ alkyl group. In still yet other embodiments, $R^1$ is a $C_9$ alkyl group, n is 10 and m is 1.

Amphoteric Surfactants

Also useful in the compositions are surface active substances which are categorized as amphoteric surfactants. Amphoteric surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphino. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Amine oxides are tertiary amine oxides corresponding to the general formula:

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 18 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Suitable amine oxides can include those selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide. An exemplary commercially-available cocoamine oxide surfactant is BARLOX 12, available from Lonza.

Suitable long chain imidazole derivatives may generally have the general formula:

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8-C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes which are suitable include, without limitation, alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-$C(O)$—NH—$CH_2$—$CH_2$—$N^+$($CH_2$—$CH_2$—$CO_2Na$)$_2$—$CH_2$—$CH_2$—OH or $C_{12}$-alkyl-$C(O)$—$N(H)$—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J. A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch), which is herein incorporated by reference in its entirety.

Cationic Surfactants

Also useful in the compositions are surface active substances which are categorized as cationic surfactants if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The simplest cationic amines, amine salts and quaternary ammonium compounds can be schematically drawn thus:

in which, R represents an alkyl chain, R', R", and R'" may be either alkyl chains or aryl groups or hydrogen and X represents an anion.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like.

Cationic surfactants useful in the compositions include those having the formula $R^1_m R^2_x Y_L Z$ wherein each $R^1$ is an organic group containing a straight or branched alkyl or alkenyl group optionally substituted with up to three phenyl or hydroxy groups and optionally interrupted by up to four of the following structures:

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y is can be a group including, but not limited to:

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Additional Functional Ingredients

The components of the stabilized solid compositions can further be combined with various functional components suitable for use in various applications of use, including laundry softening and/or detergent compositions, water treatment compositions, rinse aid applications, sanitizing compositions, and the like. In some embodiments, additional functional ingredients are included in the compositions, such as the exemplary compositions described in Tables 1A-1C. The functional ingredients provide desired properties and functionalities to the compositions. For the purpose of this application, the term "functional ingredient" includes a material that when dispersed or dissolved in a use and/or concentrate solution, such as an aqueous solution or suspension, provides a beneficial property for the intended application of use and/or maintaining stability and suitable processing and/or dispensing of the solid composition. Some particular examples of functional materials are discussed in more detail below, although the particular materials discussed are given by way of example only, and that a broad variety of other functional ingredients may be used.

In certain embodiments, the additional functional ingredients include sequestrants and/or chelants, binders, solidification aids, corrosion inhibitors, salts including salts for conductivity, fillers, defoaming agents, anti-redeposition agents, solubility modifiers, processing aids, dispersants, additional stabilizing agents, additional surfactants, anti-wrinkling agents, optical brighteners, fragrances and/or dyes, rheology modifiers or thickeners, hydrotropes or couplers, buffers, solvents, enzymes, soil-release agents, dye scavengers, germicides/fungicides, sanitizers and components for residual protection, soil release agents, and the like.

Chelating/Sequestering Agents

The stabilized solid compositions may also include effective amounts of chelating/sequestering agents, also referred to as builders. In general, a chelating agent is a molecule capable of coordinating (i.e., binding) the metal ions commonly found in water sources to prevent the metal ions from interfering with the action of the other ingredients of a rinse aid or other cleaning composition. The chelating/sequestering agent may also function as a water conditioning agent when included in an effective amount. In some embodiments, a solid composition can include in the range of up to about 70 wt-%, about 1-60 wt-%, about 1-50 wt-%, or about 10-50 wt-% of a chelating/sequestering agent.

Exemplary chelants include aminocarboxylates and polycarboxylates. Some examples of aminocarboxylates useful as chelating/sequestering agents, include, N-hydroxyethyl-iminodiacetic acid, nitrilotriacetic acid (NTA), ethylenediaminetetraacetic acid (EDTA), glutamic-N,N-diacetic acid (GLDA), N-hydroxyethyl-ethylenediaminetriacetic acid (HEDTA), diethylenetriaminepentaacetic acid (DTPA), methyl-glycine-diacetic acid (MGDA), and the like. Some examples of polymeric polycarboxylates suitable for use as sequestering agents include those having a pendant carboxylate (—$CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

Often, the cleaning composition is also phosphate-free and/or sulfate-free. In embodiments of the solid composition that are phosphate-free, the additional functional materials, including builders exclude phosphorous-containing compounds such as condensed phosphates and phosphonates. In embodiments of the solid compositions which are not phosphate-free, added chelating/sequestering agents may include, for example a condensed phosphate, a phosphonate, and the like. Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

In embodiments of the solid composition which are not phosphate-free, the composition may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt 2-hydroxyethyliminobis(methylenephosphonic acid) $HOCH_2 CH_2 N[CH_2 PO(OH)_2]_2$; diethylenetriaminepenta(methylenephosphonic acid) $(HO)_2 POCH_2 N[CH_2 N[CH_2 PO(OH)_2]_2]_2$; diethylenetriaminepenta(methylenephosphonate), sodium salt $C_9 H_{(28-x)} N_3 Na_x O_{15} P_5$ (x=7); hexamethylenediamine(tetramethylenephosphonate), potassium salt $C_{10} H_{(28-x)} N_2 K_x O_{12} P_4$ (x=6); bis(hexamethylene)triamine (pentamethylenephosphonic acid) $(HO_2)POCH_2N[(CH_2)_6 N[CH_2 PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Salts

The stabilized solid compositions may also include effective amounts of salts, including to aid in the solidification matrix, preferably water soluble salts. Salts, including water soluble salts, can be either organic or inorganic. Water soluble salts include a salt of a polycarboxylic acid, which is an acid with more than one carboxylate group, including for example diacids and triacids such as citrate. Water soluble salts include salts of acids such as carboxylic acids (aliphatic, acetic, formic), aromatic (benzoic, salicylic) or dicarboxylic acids such as oxalic, phthalic, sebacic, adipic, glutaric; tricarboxylic acids such as citric acid, carboxylic acids such as aliphatic (oleic, palmitic, stearic), or aromatic (phenylstearic), or even water soluble amino acids or salts such as those having sodium, potassium, aluminum, magnesium, titanium, ammonium, triethanolamine, diethanolamine and/or monoethanolamine as the cation. Salts can also include neutral salts, including for example, sulphates and the like. A preferred salt of an acid is sodium citrate and/or monosodium citrate.

In embodiments where a salt is included in the stabilized solid composition, the salt is present at a level in the range of from about 0 wt-% to about 50 wt-%, from about 5 wt-% to about 50 wt-%, from about 5 wt-% to about 50 wt-%, from about 10 wt-% to about 50 wt-%, preferably from about 15 wt-% to about 50 wt-%, or preferably from about 20 wt-% to about 40 wt-%, based on the total weight of the solid composition.

Fillers

The solid compositions can optionally include a minor but effective amount of one or more of a filler. Some examples of suitable fillers may include for example, sodium chloride, starch, sugars, $C_1$-$C_{10}$ alkylene glycols such as propylene glycol, sulfates, PEG, urea, sodium acetate, magnesium sulfate, sodium acetate, magnesium sulfate, sodium carbonate and the like. In some embodiments, a filler can be included in an amount in the range of up to about 50 wt-%, and in some embodiments, in the range of about 1-15 wt-%.

Hardening/Solidification Agents/Solubility Modifiers

In some embodiments, one or more solidification agents may be included in the solid compositions. Examples of hardening agents include urea, an amide such stearic monoethanolamide or lauric diethanolamide or an alkylamide, and the like; sulfate salts or sulfated surfactants, and aromatic sulfonates, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the active ingredients may be dispensed from the solid composition over an extended period of time.

Suitable aromatic sulfonates include, but are not limited to, sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butyl naphthalene. Preferred aromatic sulfonates include sodium xylene sulfonate and sodium cumene sulfonate The amount of solidification agent included in a solid composition can be dictated by the desired effect. In general, an effective amount of solidification agent is considered an amount that acts with or without other materials to solidify the cleaning composition. Typically, for solid embodiments, the amount of solidification agent in a composition is in a range of about 10 to about 80% by weight of the solid composition, preferably in the range of about 20 to about 75% by weight more preferably in the range of about 20 to about 70% by weight of the solid composition.

Processing Aids

The solid compositions can include an effective amount of a processing aid. Suitable processing aids to provide flowable powder compositions and/or reducing aeration of cast solid compositions include organic solvents. Exemplary organic solvent processing aids comprises methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, hexylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or any combination thereof. In a preferred embodiment, propylene glycol is the processing aid for powder solid compositions. In a preferred embodiment, hexylene glycol is the processing aid for powder solid compositions.

Additional processing aids for dispensing and processing can include carboxylic acids. Suitable carboxylic acids may be saturated or unsaturated but are preferably saturated carboxylic acids. These carboxylic acids have at least 6 carbon atoms, or from about 6 to about 22 carbon atoms on the alkyl or alkenyl chain, and are in either straight chain or branched chain configuration, preferable carboxylic acids are in straight chain configuration having at least 6 carbon atoms, preferably from about 12 to about 22 carbon atoms. Non-limiting examples of useful carboxylic acids include lauric acid (C12), stearic acid (C18), palmitic acid (C16) or behenic acid (C22). Additional examples include long chain fatty acids or its salt, such as stearic acid, palmitic acid, coco fatty acid, stearic monoethanolamide, coco-monoethanolamide, and the like. Without being limited to a particular mechanism of action or theory of the inveiton, the C6-C22 alkyl chains of the carboxylic acid stabilizing agents are preferred as they readily form hard, low-melting urea occlusion complexes and are compatible with quaternary ammonium compounds. Additional processing aids can include LMEA (lauric monoethanolamide), SMEA (stearic monoethanolamide), etc.

When included in the solid compositions the processing aid is present at a level of from about 0.1% to about 10.0% by weight based on the total weight of the composition, and preferably from about 0.5% to about 5%.

Salt for Conductivity

The solid composition may also include at least one additional salt as an additional processing aid. In an embodiment, the additional salt is a salt for conductivity and/or is an inorganic anion or non-sequestering organic anion to allow for standard measurements of conductivity of the wash solution. Sodium chloride is preferably used, however a wide variety of ionizable salts can be used. Examples of suitable salts are the halides and acetates of the group IA metals of the Periodic Table of the Elements, for example, lithium chloride, sodium chloride, potassium chloride, ammonium chloride, sodium bromide, potassium bromide, calcium bromide, sodium iodide, potassium iodide, sodium acetate, potassium acetate, or mixtures thereof. Sodium chloride is preferred. The ionizable salts are particularly useful during the process of mixing the ingredients to make the compositions herein, and later to obtain the desired conductivity for measurement of dispersement rates of the softening composition. The amount of ionizable salts used depends on the amount of active ingredients used in the compositions and can be adjusted according to the desire of the formulator. In a preferred embodiment, a salt for conductivity included in the solid compositions preferably has a solubility of at least about 5 ppm at 45° C.

The salt for conductivity, such as sodium chloride can be present at a level of from about 0% to about 60% by weight based on the total weight of the composition preferably from about 1% to about 50% by weight based on the total weight of the solid laundry softening composition.

Dispersant

A dispersant may be included to help remove soils and microorganisms from articles and surfaces. Examples of dispersants include, but are not limited to, to water soluble polymers, surfactants, hydrotropes, and wetting agents. In a preferred embodiment the dispersant is an anionic surfactant. The composition need not include a dispersant, but when a dispersant is included it can be included in an amount that provides the desired dispersant properties. Suitable ranges of the dispersant in the composition can be up to about 20 wt-%, about 0.5 to about 15 wt-%, or about 2 to about 9 wt-%.

Preservatives

The solid compositions can also include effective amount of a preservative. Preferred preservatives for use include, but are not limited to, methylchloroisothiazolinone, methylisothiazolinone, pyrithione derivatives and salts, glutaraldehyde, or a mixture of the same. A preferred blend of methylchloroisothiazolinone and methylisothiazolinone is available from Dow Chemical under the trade name KATHON™ CG. A preferred pyrithione salt is sodium pyrithione. When a preservative is included in the solid compositions, it can be present from about 0.01 to about 5 wt. %; preferably from about 0.01 to about 3 wt. %; more preferably from about 0.05 to about 2 wt. %; and even more preferably from about 0.05 to about 1 wt. %.

Sanitizers/Anti-Microbial Agents

The solid compositions can optionally include a sanitizing agent. Sanitizing agents also known as antimicrobial agents are chemical compositions that can be used in a solid functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds. It should also be understood that active oxygen compounds may also act as antimicrobial agents. For example, percarbonate compositions have been demonstrated to provide excellent antimicrobial action.

Examples of common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

In some embodiments, the solid composition comprises, an antimicrobial component in the range of up to about 10 wt-% of the composition, in some embodiments in the range of up to about 5 wt-%, or in some embodiments, in the range of about 0.01 to about 3 wt-%, or in the range of 0.05 to 1 wt-% of the composition.

Exemplary Stabilized Solid Compositions

Exemplary stabilized solids for various applications of use are described in Table 1.

TABLE 1

| Material | First Exemplary Range wt-% | Second Exemplary Range wt-% | Third Exemplary Range wt-% |
|---|---|---|---|
| Hygroscopic material | 20-80 | 20-60 | 25-55 |
| Stabilizing surfactant | 1-30 | 7.5-25 | 10-20 |
| Chelant | 1-60 | 1-50 | 10-50 |
| Additional Functional Ingredients | 0-50 | 0-40 | 0-30 |

Stabilized Solid Compositions

The stabilized solid compositions are preferably multi-use solid compositions formed by combining the components in the weight percentages and ratios disclosed herein. The solid compositions are provided as a solid and a use solution, wherein the use solution is a suspension, is formed during the dispensing and/or laundering process. The solid compositions are substantially homogeneous with regard to the distribution of ingredients throughout its mass and are dimensionally stable.

The solid compositions can be a pressed solid, a cast or extruded solid. The resulting solid may take forms including, but not limited to: a flake, a granule, a pellet, a tablet, a lozenge, a puck, a briquette, a brick, or another solid form known to those of skill in the art. In a preferred embodiment the solids are solid blocks with dimensional stability, as measured by a growth exponent of less than 5%, or less than 3% if heated to a temperature of 40° C. taking into account change in any dimension of the solid composition.

A solid block can be provided in the form of a unit dose or a multi-use solid. A unit dose refers to a solid detergent composition unit sized so that the entire unit is used during a single washing cycle. When the solid composition is provided as a unit dose it may have a size between about 1 gram and about 50 grams. Alternatively, a solid tablet may have a size of between about 50 grams and about 250 grams. A solid block, including a multi-use block may have a weight of about 250 grams or greater. In some embodiments, the solid block has a mass of between about 250 grams and 10 kilograms, preferably between about 1 pound and about 10 pounds.

In some embodiments, the solid composition may be dissolved, for example, in an aqueous or other medium, to create a concentrated and/or use solution. The solution may be directed to a storage reservoir for later use and/or dilution or may be applied directly to a point of use in the laundering application. The solid compositions are beneficially designed as multi-use solids, such as blocks, and can be repeatedly used for multiple cycles or applications.

Methods of Use

The stabilized solid compositions are suitable for consumer and industrial applications in need of a water conditioning agent. Single use and multi-use solid compositions can be provided according to the embodiments described here.

The solid compositions can be dosed into a wash cycle or dosed into a system in need of generating a use solution to contact and clean a surface. A solid composition is provided at a desired "dispense rate", referring to an amount of the solid mass provided either through a dispensing unit or preferably dosed directly into a system and subjected to water contact through the dispenser's mechanism for a certain period of time. The solid contacts water at a certain temperature and pressure to dissolve into a use solution the powder or solid block composition for cleaning applications. A variety of dispensers are suitable for dispensing the solid cleaning compositions disclosed herein. A dispenser uses a block of a specific dimension and shape and can be configured to deliver water of a certain temperature and pressure. In preferred embodiments, a dispenser is not required for use of the solid cleaning compositions. In certain embodiments, a user doses (or provides the solid) directly into a system in need of cleaning and water at a desired temperature and pressure is applied to the solid within the system.

In other aspects, the solid compositions may be initially used to generate an aqueous solution or suspension for delivery to a hard surface for cleaning. Thereafter, the use solutions are applied to the internal surfaces of the apparatus, such as for example, through the use of spray nozzles and/or spray jets or the like.

In either embodiment, employing a dispenser or the solid composition placed directly into a system in need of cleaning, a user controls the dispense rate of the solid, via the water source and how it is applied (such as through a nozzle and dispense plate) with a certain temperature and pressure. When the water contacts the solid composition, it dissolves the components of the block or powder into a use solution.

In exemplary applications of use, the solid compositions are contacted by water at a temperature of at least about 90° F., at least about 115° F., or at least about 140° F. may be used. A pressure of at least about 20 psi, at least about 35 psi, or at least about 50 psi for water may also be used, respectively. In preferred embodiments, the range for water temperature is typically from about 50° F. to about 160° F., and the range for water pressure from about 20 psi to about 100 psi; preferably with temperatures about 90° F. to about 140° F. and water pressures from about 20 psi to about 60 psi. Various types of water can be used. In some aspects city or municipal water with 0, 5, 17, or higher grains per gallon (gpg) is employed.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following materials were used in the listed examples:

Water Conditioning Polymer A: neutralized homopolymer of acrylic acid, available from Rohm and Haas Company.

Water Conditioning Polymer B: carboxylated polyelectrolye copolymer, available from Rohm and Haas Company. Copolymer A: acrylic acid maleic acid copolymer, solid form, available from Rohm and Haas Company.

Copolymer B: maleic acid acrylic acid copolymer, granular form, available from BASF.

Quaternary ammonium compound: A blend of twin chain quaternary ammonium compounds and alkyl dimethyl benzyl ammonium chloride, available from Lonza.

Amine oxide: A cocoamine oxide amphoteric surfactant, available from Lonza.

AOS: An alpha olefin sulfonate anionic surfactant, available from Stepan Company.

SLS: an anionic sulfate surfactant.

Nonionic surfactant: A $C_{12-14}$ linear alcohol ethoxylate, available from Huntsman.

A trisodium salt of methylglycinediacetic acid ($Na_3MGDA$, MGDA), available from BASF Corporation.

An alkyl polyglucoside surfactant, available from Dow Chemicals.

Commercially available quaternary carboxylate cocoamidopropyl betaine (amphoteric), sodium carboxymethyl cellulose, sodium citrate dihydrate, sodium lauryl sulfate.

Example 1

Stability Testing of Water Conditioning Agents

Charged hygroscopic solids—water conditioning agents—were prepared and tested in combination with various types of surfactants to test the ability of the surfactant to stabilize the hygroscopic solids compositions. Table 2 shows the hygroscopic solid premix formulations, which included a combination of a charged hygroscopic solid (polyacrylate) and chelating agent.

TABLE 2

| Ingredient | Premix 1 | Premix 2 (high chelant) |
| --- | --- | --- |
| MGDA chelant | 35 | 55 |
| Water Conditioning Polymer A | 55 | 35 |
| Total | 90 | 90 |

Figure 1A:
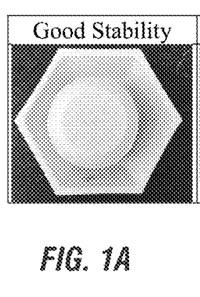
FIGS. 1A-1E show comparison images of solid compositions having varying degrees of blooming for reference, including examples of solids having good stability (FIG. 1A), light blooming (FIG. 1B), moderate blooming (FIG. 1C), severe blooming (FIG. 1D), to a liquid (FIG. 1E).
Figure 1B:
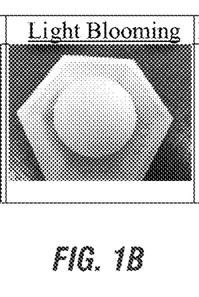
Figure 1C:
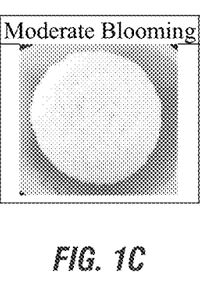
Figure 1D:
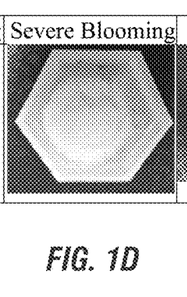
Figure 1E:
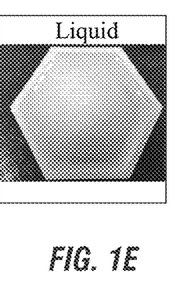

Various Surfactants were added at 10-wt % of the formulation with the 90-wt % of the applicable Premix for a composition having a total of 100 wt-% for Experiments 1-8. All Experiments were conducted with Premix 1 except for Experiment 9 which used Premix 2 (high chelant). The various Experiments conducted, in addition to the surfactant used, are shown in Table 3. Both Experiments 9 and 10 did not include a surfactant, and instead replaced the surfactant with 5 wt-% water (95 wt-% Premix). Experiment 9 contained Premix 2 as the high chelant composition, and Experiment 10 contained Premix 1 to serve as the control. The solid compositions were stored for 1 week at 40° C. inside a humidity chamber with 65% humidity. The degree of blooming of the solid compositions were evaluated in addition to the increase in mass calculated by % mass increase. These Experiments served as an initial screening assessment of the types of surfactants able to stabilize ionic hydroscopic species. Accordingly, there is no threshold % increase in mass required for stabilization; instead the lowest percent increase in mass are successful results; as confirmed by low or moderate blooming in the samples. A visual depiction and examples of the various degrees of blooming are shown in FIG. 1 for reference: good stability/no blooming (FIG. 1A); light blooming (FIG. 1B); moderate blooming (FIG. 1C); severe blooming (FIG. 1D); and poor stability/liquid (FIG. 1E). As shown in FIG. 1, the more severe the blooming, the less stable the solid composition. The results of the stability of the hygroscopic solid compositions are shown in Table 3.

TABLE 3

| Experiment | Surfactant (at 10 wt-%) | Surfactant Type | Blooming Observations | % Increase in Mass |
| --- | --- | --- | --- | --- |
| 1 | Cocoamidopropyl betaine | Amphoteric (Quaternary Carboxylate) | Severe Blooming | 29 |
| 2 | AOS, 40% | Anionic (sulfonate) | Light Blooming | 17 |
| 3 | Amine oxide, 30% | Amphoteric (amine oxide) | Severe Blooming | 23 |
| 4 | SLS, 30% | Anionic (sulfate) | Moderate to Severe Blooming | 21 |
| 5 | C12-C14 linear alcohol ethoxylate | Nonionic | Liquid-Near Overflow | 27 |
| 7 | Alkyl polyglucoside, 50% | Alkyl poly glucoside | Liquid-Near Overflow | 27 |
| 8 | Quaternary ammonium compound | Cationic | Severe Blooming-Near Overflow | 28 |

TABLE 3-continued

| Experiment | Surfactant (at 10 wt-%) | Surfactant Type | Blooming Observations | % Increase in Mass |
|---|---|---|---|---|
| 9 | No surfactant (Premix 2, 5 wt-% water) | N/A | Moderate Blooming | 18 |
| 10 | No surfactant (Premix 1, 5 wt-% water) | N/A | Liquid-Near Overflow | 33 |

As shown in Table 3, the anionic and amphoteric surfactants showed improved stabilization of the hygroscopic solid compositions compared to the other surfactants, where the anionic and amphoteric surfactants prevented the hygroscopic solids from turning into liquids. Without being bound by a particular mechanism of action or theory of the invention, the stabilization is believed to be due to the charge stabilization of the surfactants and therefore the anionic and amphoteric surfactants are employed as stabilizing agents. Accordingly, the results demonstrate that ionic (cationic and anionic) and amphoteric surfactants are more effective than nonionic surfactants in stabilizing a hygroscopic solid composition.

The high chelant control (EXP 9) also performed well without the use of the surfactant. As the polyacrylate is hygroscopic and the chelant is not very hygroscopic, the lowering of the amount of polyacrylate decreases the water absorption of the block. Note that the addition of surfactant (such as the anionic sulfonate surfactant) resulted in equivalent water absorption and better swelling than the high chelant control with 20% more water conditioning polymer.

Example 2

Water Conditioner Stability Testing

Water conditioner formulations containing hygroscopic materials were combined with an amine oxide surfactant to evaluate the ability of the amine oxide surfactant to stabilize the formulations based on the testing in Example 1. Water conditioner formulations were formulated according to Table 4. Table 4 also shows the dimensional stability measurements (percent swelling for each formulation after 2 weeks at 40° C. inside a humidity chamber with 65% humidity). The measurement of dimensional stability is a preferred stability measurement in comparison to the percent mass change in Example 1.

Figure 2:
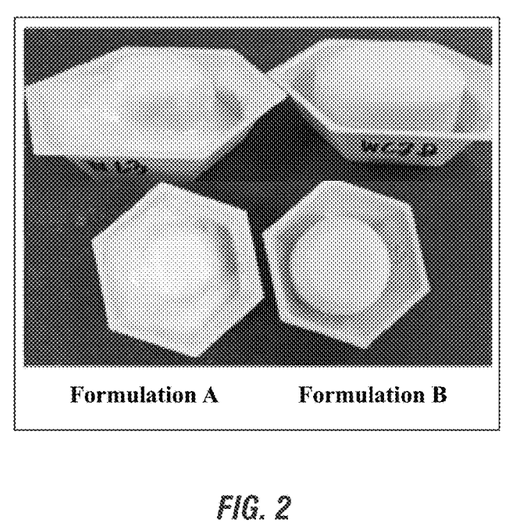
FIG. 2 shows a comparison of Formulation A, which did not include an amine oxide surfactant, versus Formulation B, which did include an amine oxide surfactant, and how the surfactant affected the stability of each formulation.

Formulation A contained no amine oxide surfactant, whereas Formulations B, C, and D contained 10 wt-%, 5 wt-%, and 7.5 wt-% of amine oxide surfactant (30%) on a weight-% basis (not an actives basis), respectively. FIG. 2 shows a comparison of the solid water conditioner formulations of Formulation A versus Formulation B after 2 weeks, where Formulation B demonstrates visually detectable improvements in stability as there is no weeping or liquification of the solid composition.

TABLE 4

| Ingredient | Formulation A (wt-%) | Formulation B (wt-%) | Formulation C (wt-%) | Formulation D (wt-%) |
|---|---|---|---|---|
| Water Conditioning Polymer B, powder | 11.1 | 10.5 | 11.1 | 10.8 |
| Sodium Carboxymethyl Cellulose, 95% | 4.3 | 4.1 | 4.3 | 4.2 |
| Water Conditioning Polymer A, powder | 40.0 | 39.8 | 40.0 | 40 |
| MGDA | 25.3 | 22.1 | 25.3 | 23.6 |
| Sodium Citrate Dihydrate | 14.3 | 13.5 | 14.3 | 13.9 |
| amphoteric amine oxide surfactant (30%) | 0 | 10.0 | 5.0 | 7.5 |
| DI Water | 5.0 | 0 | 0 | 0 |
| Total | 100 | 100 | 100 | 100 |
| Dimensional Stability % Swell after 2 Weeks | Cannot measure (Formulation liquified) | 0.7% | 87.6% | 20.2% |

Figure 3:
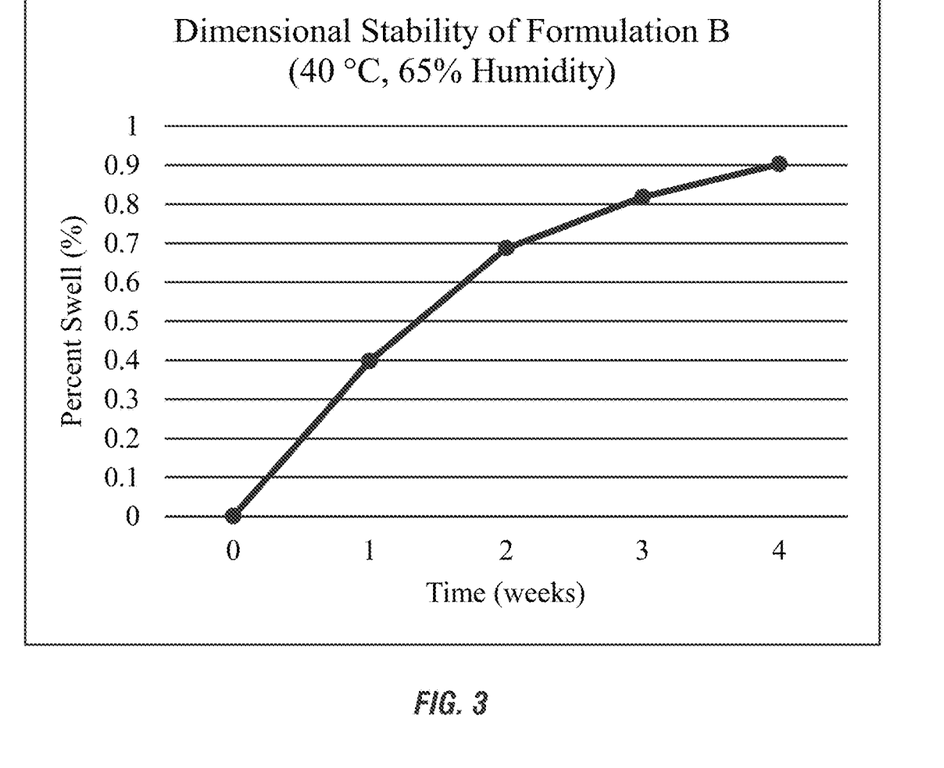
FIG. 3 shows a graph of the dimensional stability of Formulation B measured by percent swelling over a period of 4 weeks, and under temperatures of 40° C. and 65% humidity.

Based on the significant improvement in composition stability seen in Formulation B at 2 weeks, the dimensional stability of Formulation B was tested over a 4 week period. FIG. 3 shows a graphical representation of the dimensional stability of Formulation B by measuring percent swelling over a period of 4 weeks under temperature conditions of 40° C. and 65% humidity. For commercial dimensional stability ≤5% swelling, preferably ≤3% swelling is required; Formulation B meets both standards as the percent swelling did not exceed 1%.

As shown in Table 4, Formulation B, at a 40% polyacrylate formula which had 10 wt-% amine oxide surfactant, reduced swelling to <1% after 2 weeks and 4 weeks in comparison to Formulation A, at a 40% water conditioning agent formula which did not contain amine oxide surfactant and instead contained 5 wt-% water, which was highly hygroscopic.

Further, the results show that the higher the concentration of amine oxide surfactant included, the lesser the percent swelling, with drastic differences in percent swelling when comparing 5 wt-% to 7.5 wt-% to 10 wt-% of amine oxide. The results show that an amine oxide concentration greater than 7.5 wt-% can beneficially stabilize the hygroscopic materials and provide a dimensionally stable solid. These results demonstrate that without the inclusion of amine oxide surfactant, a composition including materials such as polyacrylates become highly hygroscopic, whereas the inclusion of an amine oxide surfactant greatly reduces swelling and increases the stability of water conditioner formulations.

Figure 4A:
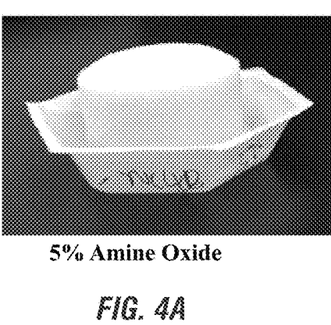
FIGS. 4A-4C shows a comparison of the stability between Formulation C (FIG. 4A, 5% amine oxide), Formulation D (FIG. 4B, 7.5% amine oxide), and Formulation B (FIG. 4C, 10% amine oxide) as they pertain to the concentration of amine oxide surfactant included in each formulation.
Figure 4B:
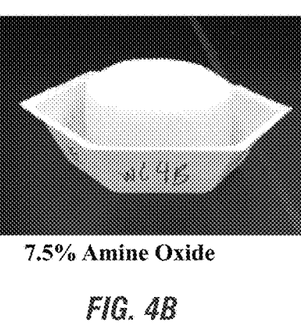
Figure 4C:
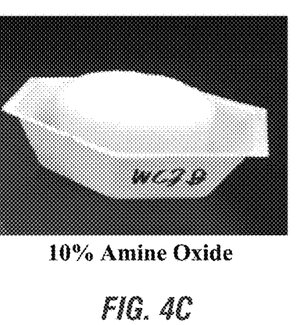

Water conditioning formulations were further compared to one another to evaluate the dimensional stability of amine oxide surfactants independent from the water present within the surfactants. Formulations B, C, and D from Table 3 were compared to one another. FIGS. 4A-4C shows the comparison at 2 weeks between Formulations B (FIG. 4C), C (FIG. 4A), and D (FIG. 4B) as shown by the wt-% amine oxide surfactant included within each formulation. Photos at 4 weeks were not included as the Formulations C and D failed after 2 weeks.

As shown in Table 4, as the concentration of amine oxide surfactant increases, for example from 5 wt-% to 10 wt-%, the percent swelling decreases from nearly 87% to <1% over 2 weeks. This demonstrates that the amine oxide surfactant itself is responsible for stabilizing the formulation, not the water in the surfactant raw material as was accounted for in Formulation A from Table 4 (shown with 5 wt-% water, no surfactant). This is further demonstrated by the reduction in swelling with higher concentrations of amine oxide surfactant. Therefore, these results show the effectiveness of amine oxide surfactants in concentration greater than 7.5 wt-% in stabilizing highly hygroscopic solid compositions such as water conditioner compositions.

Example 3

Water Conditioner Stability Testing at Varying Surfactant/Polymer Ratios

Additional water conditioner formulations containing hygroscopic materials combined with surfactants at varying ratios were evaluated for impact on stabilization of the solid using the methods described in Example 1. The premix formulations in Table 5 was evaluated with various surfactants and the results are summarized in Table 6.

TABLE 5

| Ingredient | Premix |
|---|---|
| MGDA chelant | 52 |
| Water Conditioning Polymer A | 40 |
| Total | 92 |
| Surfactant | 8 |
| Formulation Total | 100 |

TABLE 6

| Experiment | Surfactant (8 wt-%, with a 5:1 ratio of water conditioning polymer to surfactant) | Surfactant Type | Blooming Observations | % Increase in Mass |
|---|---|---|---|---|
| 1 | Cocoamidopropyl betaine | Amphoteric (Quaternary Carboxylate) | Severe Blooming | 26 |
| 2 | AOS, 40% | Anionic (sulfonate) | Light Blooming | 16 |
| 3 | Amine oxide, 30% | Amphoteric (amine oxide) | Severe Blooming | 25 |
| 4 | SLS, 30% | Anionic (sulfate) | Light Blooming | 21 |
| 5 | C12-C14 linear alcohol ethoxylate | Nonionic | Liquid-Near Overflow | 30 |
| 7 | Alkyl polyglucoside, 50% | Alkyl poly glucoside | Liquid-Near Overflow | 29 |
| 8 | Quaternary ammonium compound | Cationic | Severe Blooming-Near Overflow | 28 |
| 9 | No surfactant (Premix, 5 wt-% water) | N/A | Liquid-Near Overflow | 31 |

Figure 5A:
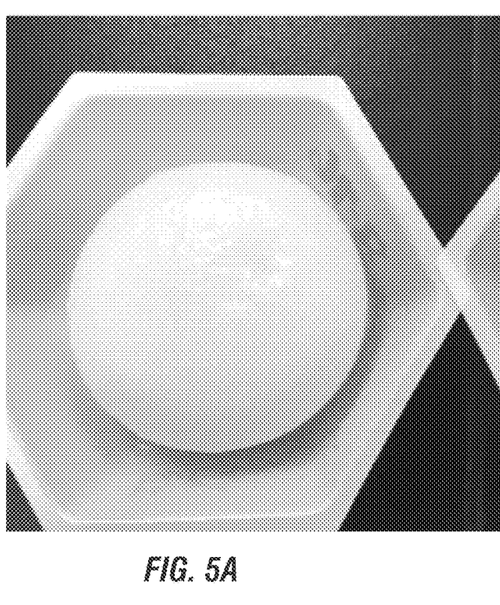
FIGS. 5A-5D shows a comparison of the stability between formulations in Example 3 containing hygroscopic water conditioning agent and surfactants at a 5:1 ratio showing light blooming with SLS (FIG. 5A) and AOS (FIG. 5B), and severe blooming with amine oxide (FIG. 5C) and the quaternary ammonium compound (FIG. 5D). Various embodiments of the present invention will be described in detail with reference to the drawings, wherein like reference numerals represent like parts throughout the several views. Reference to various embodiments does not limit the scope of the invention. Figures represented herein are not limitations to the various embodiments does not limit the scope of the invention. Figures represented herein are not limitations to the various embodiments according to the invention and are presented for exemplary illustration of the invention.
Figure 5B:
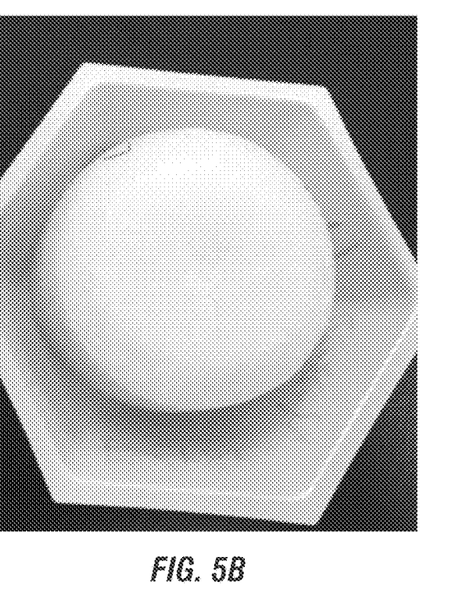
Figure 5C:
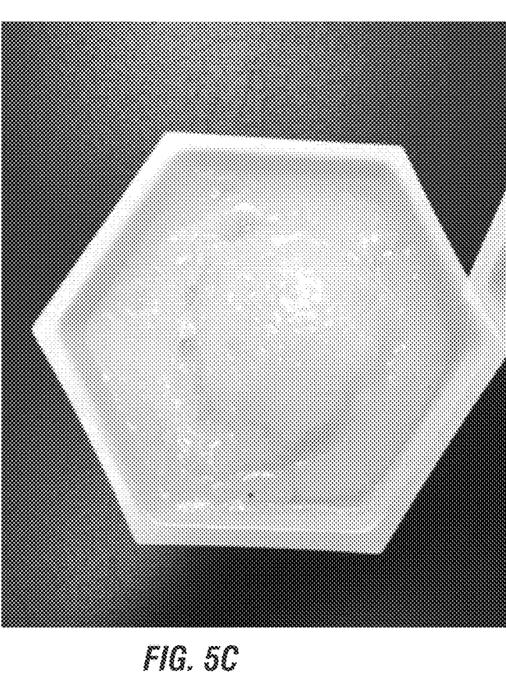
Figure 5D:
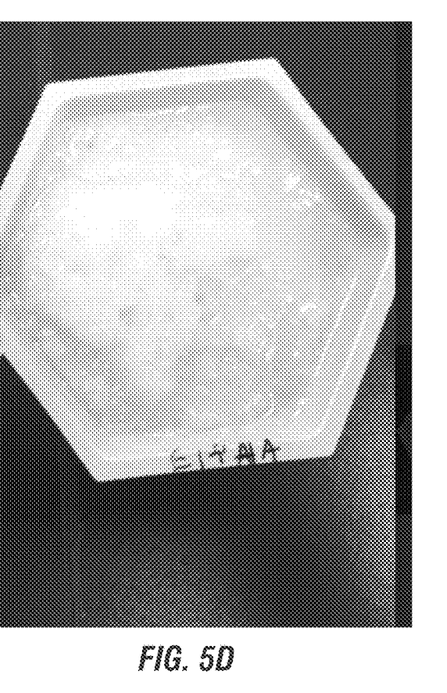

At 2 weeks, there was sufficient failures that the samples were removed from the oven. The AOS and SLS demonstrated mild blooming as shown in FIG. 5A and FIG. 5B, whereas severe blooming was seen with the amine oxide as shown in FIG. 5C and the quaternary carboxylate as shown in FIG. 5D.

These results show that increasing the surfactant ratio generally reduces water absorption for surfactants that reduce hygroscopicity (i.e. AOS, SLS and the amphoteric surfactants tested). The evaluated formulations illustrate a 'challenged' solidification composition as they contain a high polymer concentration of 40%. Moreover, this testing was measured after 2 weeks (as opposed to 1 week) while showing similar or lower levels of water absorption for the surfactants that reduce hygroscopicity of the evaluated water conditioning polymer. For surfactants that do not reduce hygroscopicity (i.e. nonionics, alkyl polyglucoside), no additional reduction was observed even at higher surfactant dose. The results demonstrate that ionic (cationic and anionic) and amphoteric surfactants are more effective than nonionic surfactants in stabilizing a hygroscopic solid composition. Although the results for some ionics showed severe blooming these 'challenged' conditions show an improved performance in comparison to the nonionics.

Example 4

Water Conditioner Dimensional Stability Testing

Following the testing of Examples 1-3 for solid stability assessing degree of blooming and % mass change, various water conditioner formulations containing the stabilized solid compositions described herein were tested for dimensional stability. The initial testing used very challenged conditions, including at high concentrations of the hygroscopic water conditioning agents, making difficult the measurement of dimensional stability. In these highly challenged formulations such large amounts of water are absorbed that blooming is an indicator of the ultimate stability of solid compositions. One skilled in the art understands that the percentage of mass increase is indicative of how a solid composition would perform for testing dimensional stability. The less % mass changes is indicative of the decrease in hygroscopicity through the formulations evaluated herein.

The measurement of dimensional stability to ensure solids have a growth exponent of less than about 5% ensures, for example, the solids can be dispensed from a dispenser without clogging or becoming lodged in a dispenser due to growth in height and/or width. The solids evaluated having light or even significant blooming and % mass changed were used to further assess the dimensional stability.

Less challenged formulations than the formulations in Examples 2 and 3 are shown in Table 7. Formulations 1, 2, 3 were pressed into tablets and the tablets were then placed in a chamber set at 122 F and 45% humidity for 1 month, then removed and left at room temperature in an ambient environment for 6 months. At the end of the 6 months, the tablets were placed in a 122 F oven for 24 hrs and the final height and diameter were recorded.

TABLE 7

| | 1 | 2 | 3 |
|---|---|---|---|
| Raw Material | | | |
| Water Conditioning Polymer B | | 10 | |
| Acrylic acid maleic acid copolymer (Copolymer A) | | | 4 |
| Trilon M (powder) | 25 | 36 | 45 |
| Powdered AOS | 2.5 | 1 | 1 |
| Liq AOS (30% active) | 2.5 | 2 | |
| Maleic acid acrylic acid copolymer (Copolymer B) | 20 | | |
| Nonionic surfactant | | 1 | |
| % change in thickness | 0.6% | 3.6% | −0.2% |
| % change in diameter | 4.3% | 1.7% | 0.8% |

As shown in Table 7, formulations 1 and 3 which include the polymers and/or copolymers in combination with the anionic surfactant AOS all have less than 5% change in diameter and thickness. The Formulation 2 includes a nonionic surfactant in combination with the AOS and has a greater increase in change in thickness and diameter.

The various embodiments being thus described, it will be apparent that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method for stabilizing a water conditioning agent into a stable solid composition comprising:

combining a water conditioning agent comprising from 22 wt-% to 26 wt-% of a chelant water conditioning agent comprising methylglycinediacetic acid (MGDA) and from 49 wt-% to 51 wt-% of a polycarboxylic acid polymer, copolymer and/or terpolymer (or salts thereof), and from 7.5 wt-% to 10 wt-% of a stabilizing surfactant comprising an amine oxide amphoteric surfactant to form a stable solid composition;

wherein the stable solid composition is pressed, cast or extruded;

wherein the stable solid composition does not comprise sodium carbonate; and maintaining the stable solid composition, wherein the stable solid composition has less than 5% change in thickness and diameter when heated to a temperature of 40° C. for two weeks with 65% humidity.

2. The method of claim 1, wherein the polycarboxylic acid polymer, copolymer and/or terpolymer (or salts thereof) is a polyacrylic acid copolymers or polyacrylate having a molecular weight between 1,000 and 100,000 g/mol.

3. The method of claim 1, wherein the amine oxide amphoteric surfactant comprises a dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl) dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide, 3-dodecoxy-2-hydroxypropyldi-(2-hydroxyethyl) amine oxide, or combinations thereof.

4. The method of claim 1, wherein the chelant water conditioning agent further comprises glutamic acid-diacetic acid (GLDA), iminodisuccinic acid (IDA), hydroximinodisuccinic acid, or salt thereof.

5. The method of claim 1, wherein the solid composition is phosphate free.

* * * * *